(12) United States Patent
Kato et al.

(10) Patent No.: US 6,581,778 B1
(45) Date of Patent: Jun. 24, 2003

(54) POWDER RECEIVING DEVICE

(75) Inventors: Fumio Kato, Handa (JP); Shinsaku Kamimura, Handa (JP)

(73) Assignee: Tsukasa Industry Co., Ltd., Handa (JP)

( * ) Notice: Subject to any disclaimer, the term of this patent is extended or adjusted under 35 U.S.C. 154(b) by 0 days.

(21) Appl. No.: 09/362,931

(22) Filed: Jul. 28, 1999

(30) Foreign Application Priority Data

Oct. 26, 1998  (JP) .......................................... 10-303124

(51) Int. Cl.⁷ .............................. B07B 9/00; B01D 46/04
(52) U.S. Cl. ............................. 209/21; 55/304; 55/380; 55/484; 55/DIG. 12
(58) Field of Search ........................... 209/21, 22, 133, 209/136, 137, 142; 55/304, 378, 379, 380, 483, 484, DIG. 12

(56) References Cited

U.S. PATENT DOCUMENTS 4,053,653 A * 10/1977 Miyata et al. ............... 209/4 X
4,220,458 A * 9/1980 Koppelman et al. ...... 55/408 X
4,323,376 A * 4/1982 Rosenguest .................. 55/304
4,584,003 A * 4/1986 Oda et al. ..................... 55/269
6,065,922 A * 5/2000 Kato et al. .................. 414/397

* cited by examiner

*Primary Examiner*—Tuan N. Nguyen
(74) *Attorney, Agent, or Firm*—Darby & Darby

(57) ABSTRACT

A powder receiving device has a loading chamber with an integral dust collector. The dust collector preferably includes at least one bag filter which filters air taken from above powder loaded into the loading chamber. The filtered air is then fed either back into the loading chamber, into a hopper where the powder is released to an external location, or out over the container from which the powder is loaded. This air flow provides for increased fluidity of the powder. The bag filter is positioned facing the loading chamber, such that when a backwash mean sends a pulse of air into the bag filter, the collected powder is dropped back into the loading chamber. The resulting powder receiving device prevents powder from escaping when powder is transferred from a container into the loading chamber. Since the powder is prevented from escaping, the powder receiving device further provides a clean workplace.

18 Claims, 13 Drawing Sheets

POWDER RECEIVING DEVICE

BACKGROUND OF THE INVENTION

The present invention relates to a powder receiving device for receiving various types of powder transported from a truck or the like. More specifically, the present invention relates to a powder receiving device for receiving granular and/or powdered food products, feed, chemical products, and pharmaceutical products.

Powder is conventionally stored and shipped in bags or plastic containers. Alternatively, powder may be bulk shipped using a transport device such as a dump truck or a dump semi-trailer having a container with an upper section that can be opened and closed. Powder shipped in this manner arrives at a destination plant where the powder is transported with a powder air transport system installed in the plant. The powder is received by a powder receiving device (receiver) and is then stored in a silo.

Referring to FIGS. 1 and 2, a conventional system is shown for air transporting a powder from a dump truck 100 into a silo 108. Dump truck 100, arriving at a plant 101, backs into a loading area 102. A receiving hood 103, installed in loading area 102, has a powder loading opening 103a formed on a side surface. Dump truck 100 backs toward powder loading opening 103a. A container 100a is lifted and powder is loaded into receiving hood 103 from a rear door 100b. The bottom of receiving hood 103 forms a hopper-style powder outlet opening 103b. A chain conveyor 104 connects at a lower region of powder outlet opening 103b to provide lateral transfer of powder.

Powder loaded into powder loading opening 103a drops from powder outlet opening 103b through a powder feeding opening 104a of chain conveyer 104. Powder laterally transferred by chain conveyor 104 is released through a powder transfer opening 104b.

A loading hopper 105a, attached at a lower region of powder transfer opening 104b, transfers the powder vertically into a bulk conveyor 105. Powder dropped through powder transfer opening 104b is transferred upward by bulk conveyor 105. When powder reaches an uppermost section 105b of bulk conveyor 105, powder drops through a powder supplying duct 105c.

Powder supplying duct 105c connects to a powder supply opening 106a.

The powder, laterally transferred by a chain conveyor 106, drops into a powder transfer opening 106b. A connecting pipe 107 connects powder transfer opening 106b to a ceiling 108a of silo 108. Powder stored inside silo 108 is fed through an outlet gate 109 at the bottom of a hopper 108b into a supply pipeline (not shown in the figure).

In the conventional powder supply system described above, a considerable amount of powder escapes when the powder is loaded in bulk into receiver hood 103. Powder blown out from powder loading opening 103a enters back into container 100a of dump truck 100, making dump truck 100 dirty. In addition, the escaping powder aggravates the work environment around loading area 102, requiring frequent cleaning of loading area 102.

A dust collector 110 is attached at an upper floor of plant 101. A suction pipe 111 connects the inside of receiver hood 103 with dust collector 110. Powder returns to silo 108 from an outlet side of dust collector 110 through a circulation pipe 112. A suction fan 113, disposed on an upper surface of dust collector 110, takes air in through dust collector 110 and lets the air out through an outlet pipe 114 attached to a vent opening 115 of plant 101. This conventional system restricts the escape of powder to some degree.

However, since dust collector 110 is installed at a high position, extra space is required. Also, since outside air enters receiver hood 103, the internal suction power (pressure distribution) is uneven, resulting in stagnation of air and preventing efficient dust collection. Furthermore, powder retrieved in dust collector 110 must be returned to a supply line of silo 108, allowing residual powder inside circulation pipe 112 to decompose. If dust collector 110 is used, different powders from other sources can become mixed with the desired powder, thus decreasing product value.

OBJECTS AND SUMMARY OF THE INVENTION

It is a first object of the present invention to provide a powder receiving device which results in a clean workplace where the escape and flying up of powder in a loading section is minimized.

It is a second object of the present invention is to provide a powder receiving device which prevents unevenness of pressure during dust collection, thus allowing dust to be efficiently collected.

It is a third object of the present invention is to provide a powder receiving device which prevents pressure loss in the duct piping and prevents contamination inside the duct piping.

It is a fourth object of the present invention is to provide a powder receiving device which uses an air blower that requires low suction power in the dust collector.

It is a fifth object of the present invention is to provide a powder receiving device which substantially prevents noise from the dust collector.

Briefly stated, the present invention provides a powder receiving device having a loading chamber with an integral dust collector. The dust collector preferably includes at least one bag filter which filters air taken from above powder loaded into the loading chamber. The filtered air is then fed either back into the loading chamber, into a hopper where the powder is released to an external location, or out over the container from which the powder is loaded. This air flow provides for increased fluidity of the powder. The bag filter is positioned facing the loading chamber, such that when a backwash mean sends a pulse of air into the bag filter, the collected powder is dropped back into the loading chamber. The resulting powder receiving device prevents powder from escaping when powder is transferred from a container into the loading chamber. Since the powder is prevented from escaping, the powder receiving device further provides a clean workplace.

According to an embodiment of the present invention, there is provided a powder receiving device for receiving powder comprising a housing, a loading chamber within the housing for receiving the powder, a powder loading hopper attached at a bottom of the housing to direct powder from the loading chamber to an external location, a blower, the blower moving air on an air path originating inside the loading chamber, at least one bag filter in the housing in the air path, the bag filter being effective for filtering particles of the powder in the air path, and the at least one bag filter being positioned to permit the particles to fall into the powder loading hopper upon release from the bag filter.

According to another embodiment of the present invention, there is provided an integrated powder receiving device comprising a housing, a powder loading chamber in the housing, a powder loading hopper attached at a bottom of the powder loading chamber to receive powder from the housing and to direct powder to an external location, a fan drawing air from the powder loading hopper into an air path, at least one bag filter in the air path, the bag filter being of a type effective for filtering airborne particles of the powder from the air path, and the air path directed to at least one high location and one low location in the housing.

According to a further embodiment of the present invention, there is provided a powder receiving device comprising a loading chamber for conveying powder to a hopper therebelow, a blower drawing air on an air path from the loading chamber, a first air outlet from the air path, the first air outlet being close to the hopper, thereby increasing a fluidity of the powder in the hopper, whereby a flow of the powder through the hopper is improved, and a second air outlet high in the loading chamber for producing a downward flow of air toward the hopper, whereby the powder is preferentially directed toward the hopper.

The invention provides a powder receiving device wherein the dust collector is a bag filter. By using a bag filter, contamination due to adhesion of powder in internal flanges is eliminated. Thus, internally bent members can be used and flanges may project inward or outward. The result is a powder receiving device having a sleek exterior appearance which is easy to clean.

The invention also provides a powder receiving device wherein a filter is oriented toward a powder loading opening. The filter includes a plurality of bag filters disposed laterally in a row. In particular, this orientation prevents variations in suction power.

The invention also provides a powder receiving device wherein a flap is disposed at an air blowing opening of the bag filter. The flap directs air from the air blowing opening above and below a loading chamber into which powder is loaded. This air direction promotes fluidity of the powder in the loading chamber. In addition, cleaning of the device after powder is received is made easier.

The invention also provides a powder receiving device wherein an upper air blowing opening blows air flowing above the flap to below the loading chamber. The upper air blowing opening keeps the dust source (the container of the truck) near the powder loading opening clean.

The invention further provides a powder receiving device wherein a lower air blowing opening blows air flowing below the flap to above the loading chamber. This promotes fluidity of the powder.

The invention also provides a powder receiving device further including overlapping opening/closing gates. These gates protect the powder receiving operation from air currents.

The invention further provides a powder receiving device wherein a dust protection sheet is disposed on the opening/closing gate. The dust protection sheet provides further improvements in sealing the powder receiving operation from air currents.

The invention also provides a powder receiving device wherein the opening/closing gates operate by an eccentric sprocket mechanism. This mechanism allows the dust protection sheet to be smoothly folded when the opening/closing gates are closed.

The invention further provides a powder receiving device further including a sensor which detects the approach of transporting means. A control device controls the opening and closing of a door in response to a signal from the sensor. The sensor/control device combination automates the powder receiving operation.

The above, and other objects, features and advantages of the present invention will become apparent from the following description read in conjunction with the accompanying drawings, in which like reference numerals designate the same elements.

DETAILED DESCRIPTION OF THE INVENTION

Figure 3:
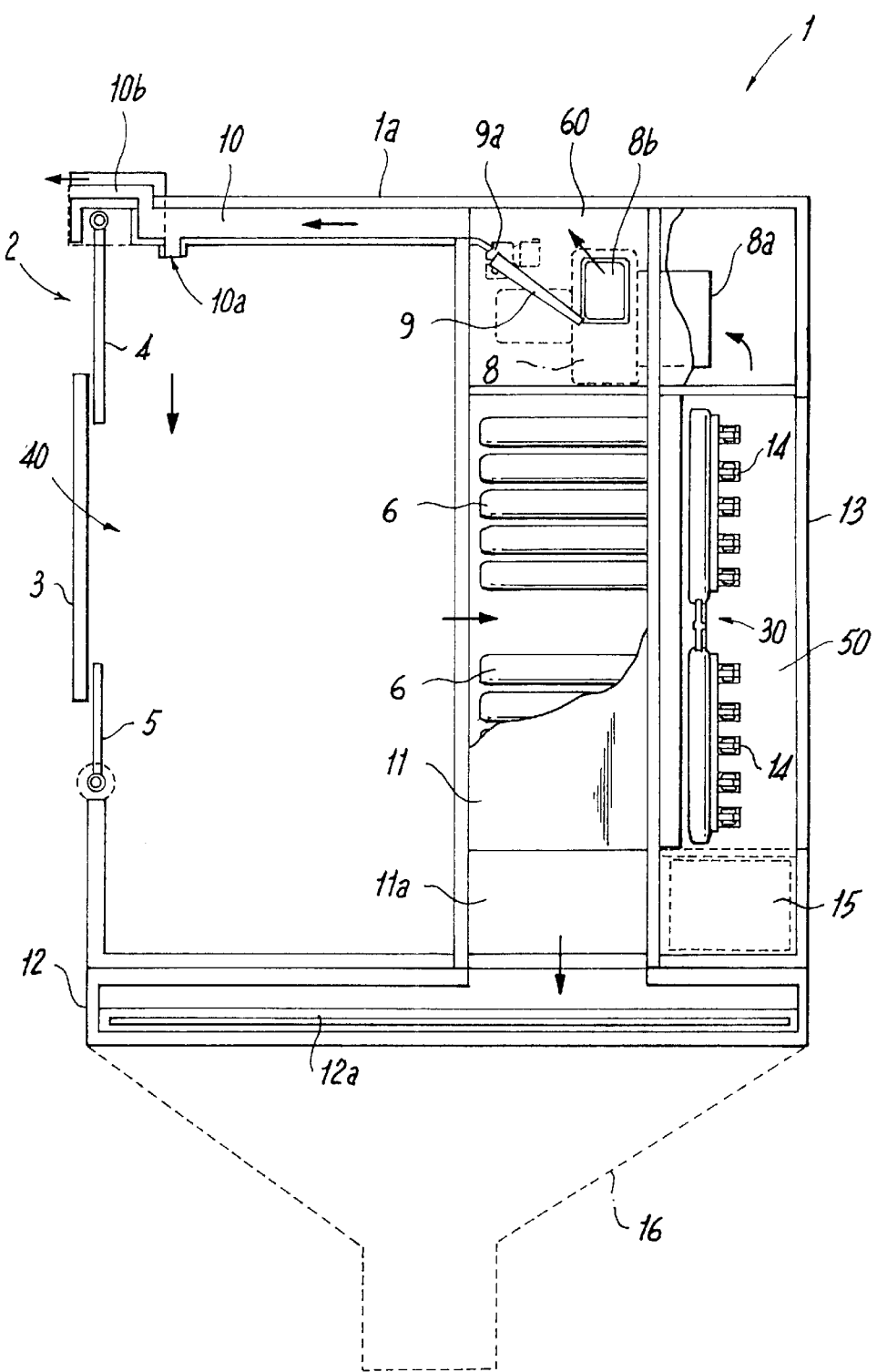
FIG. 3 is a cross sectional right side view of the internal structure of a powder receiving device according to an embodiment of the present invention.
Figure 4:
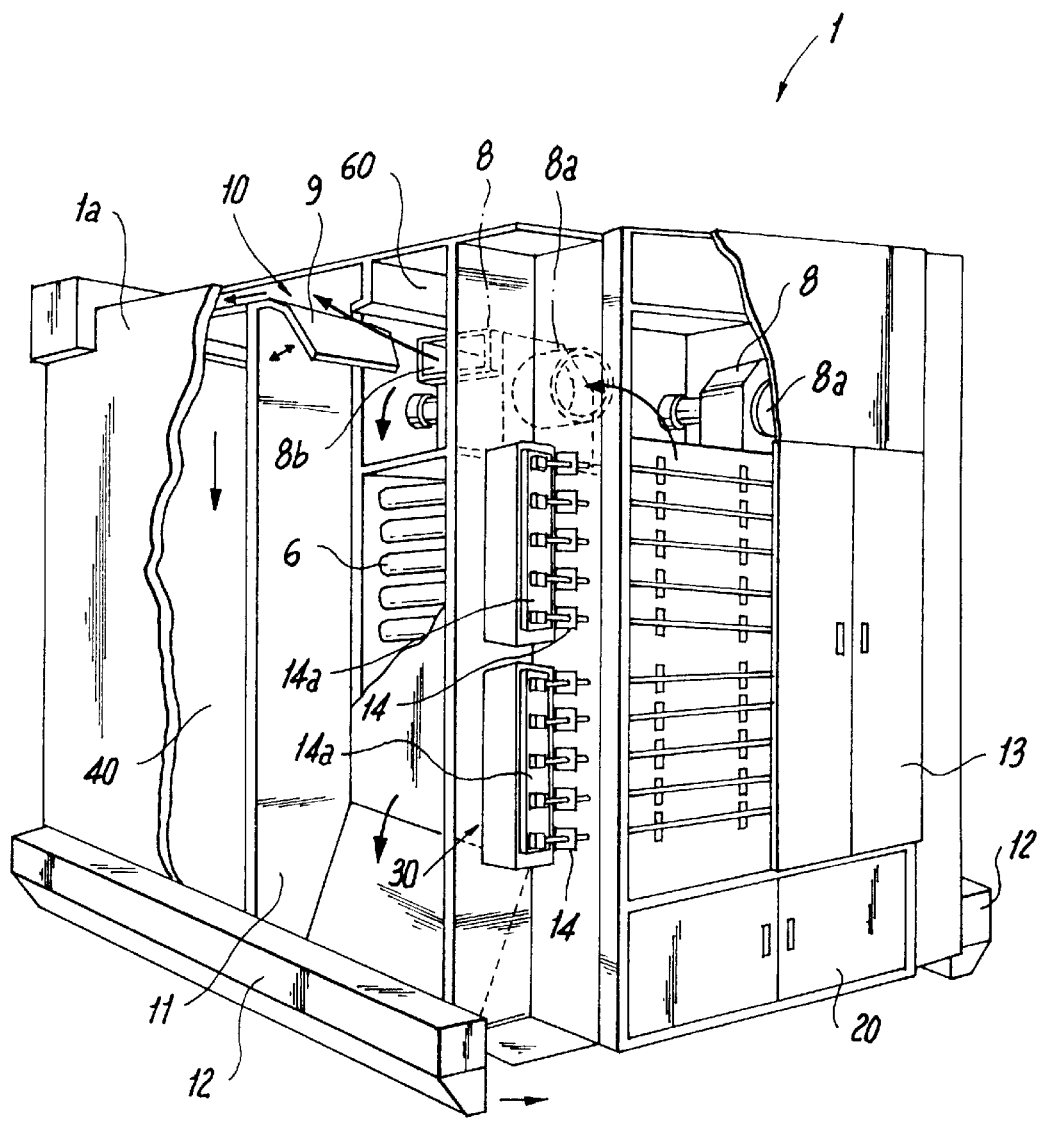
FIG. 4 is a partially cut-away perspective drawing showing the internal structure of the powder receiving device of FIG. 3.

Referring to FIGS. 3 and 4, a powder receiving device 1 includes a receiver hood 1a, in which plates, preferably aluminum plates, form a box. A front surface and a lower surface of receiver hood 1a are open. A powder loading opening 2, at a front surface of powder receiving device 1, allows insertion of a rear section of a container 17a of a dump semi-trailer 17 (see FIG. 12).

Figure 6:
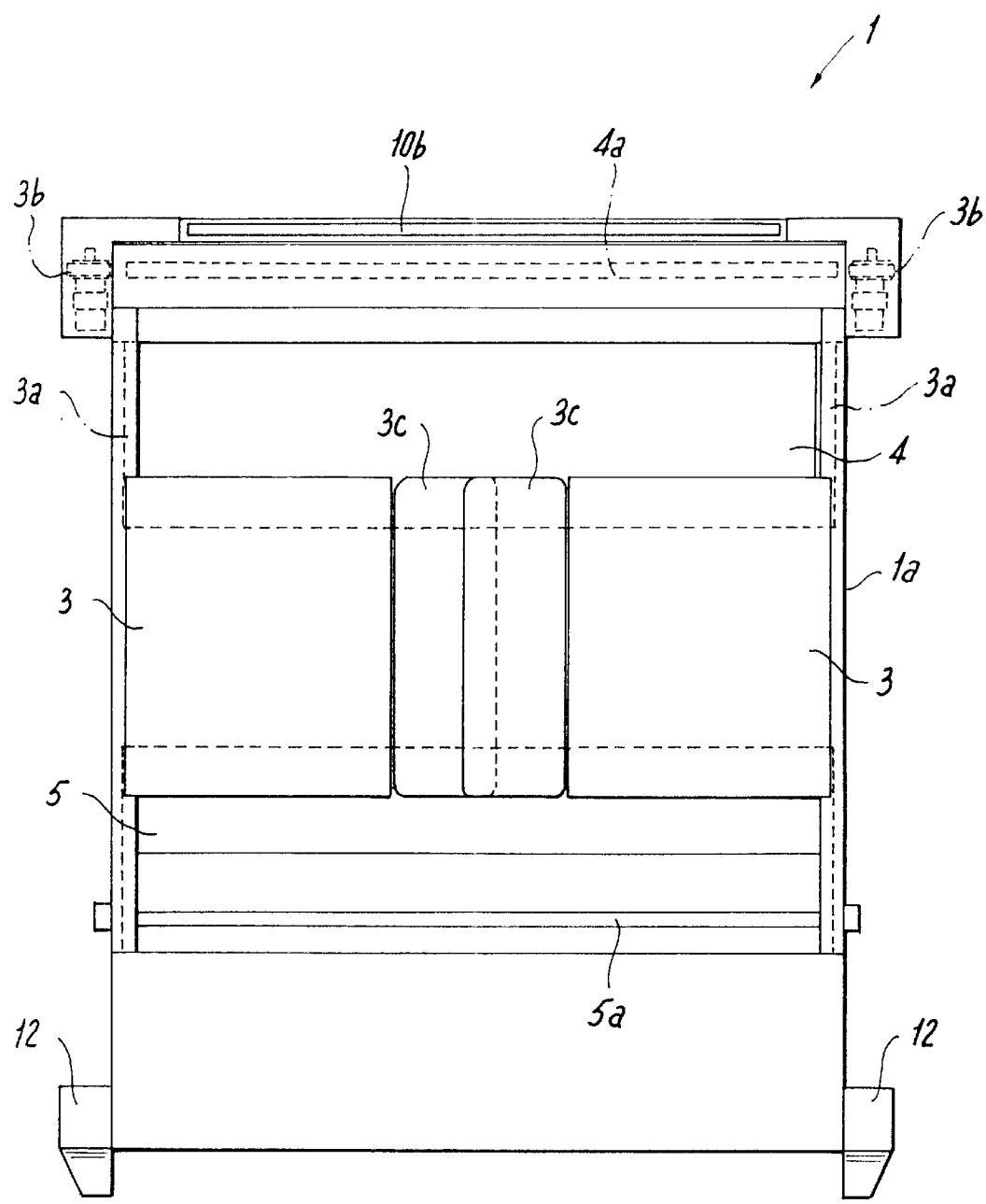
FIG. 6 is a front-view drawing of the powder receiving device of FIG. 3.
Figure 7:
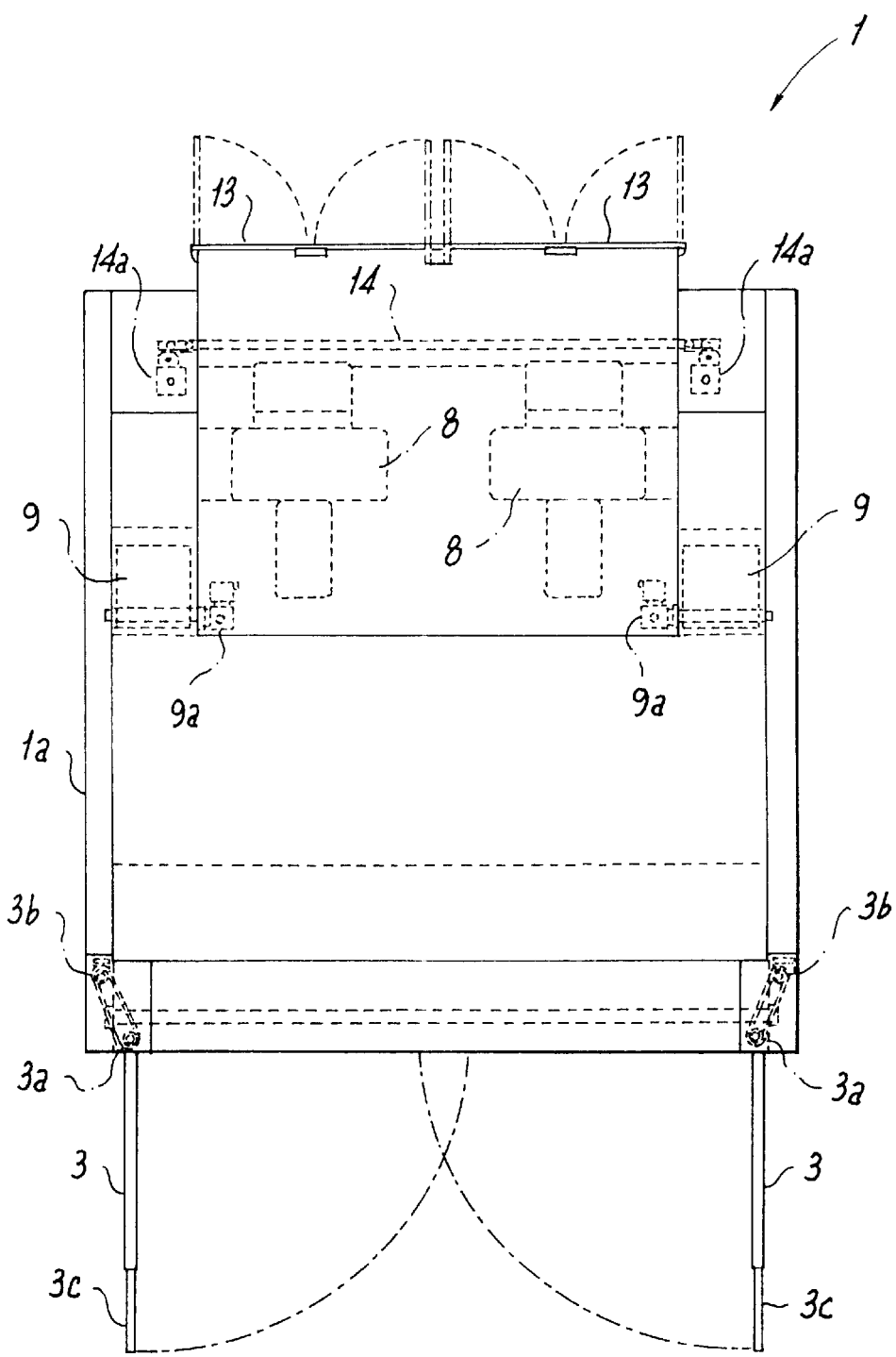
FIG. 7 is a plan drawing of the powder receiving device of FIG. 3.

Referring to FIGS. 6 and 7, an automatic opening/closing gate 3, pivotably attached to left and right ends of powder loading opening 2, has doors which open and close powder loading opening 2. Automatic opening/closing gate 3, sealing powder loading opening 2 from the left and right, is connected to an actuator 3b by a rotating shaft 3a. Actuator 3b opens and closes automatic opening/closing gate 3 using rotating shaft 3a as indicated by the dotted lines in FIG. 7. A dust-protection vinyl sheet 3c is attached to an inner side at the end of each door of automatic opening/closing gate 3. Dust-protection vinyl sheet 3c operates integrally with each door of automatic opening/closing gate 3. When automatic opening/closing gate 3 is closed, ends of dust-protection vinyl sheets 3 fold to partially overlap. Automatic opening/ closing gate 3 includes an eccentric sprocket mechanism (not shown) to stagger the timing by which the left and right doors open and close, allowing dust- protection vinyl sheet 3c to smoothly fold. A plate-shaped sealing member 4 is rotatably attached to an upper end surface of the open end of powder loading opening 2 with a shaft 4a. Sealing member 4 is preferably pulled vertically (hanging down) by a spring or the like. A plateshaped sealing member 5 is pivotably attached to a lower end surface of the open end of powder loading opening 2. Sealing member 5 is pulled by a spring or the like to maintain an upright position. A gap is formed between a lower end of sealing member 4 and an upper end of sealing member 5. Thus, when powder is not being received, outside air is shielded from the inner space of powder receiving device 1. When powder is being received, the inner space of powder receiving device 1 is continuous with the outside air.

Figure 5:
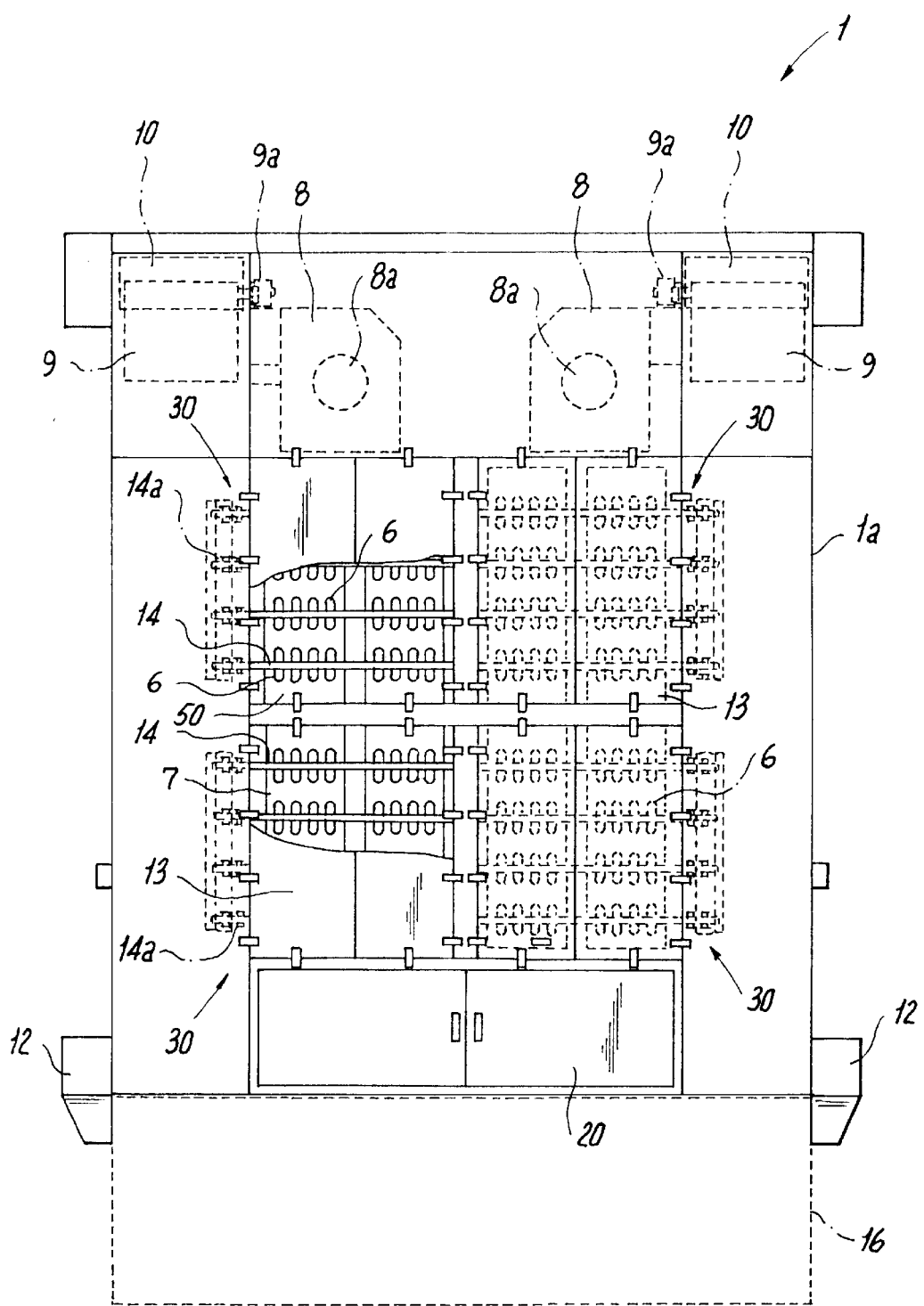
FIG. 5 is a cross sectional rear-view drawing of the powder receiving device of FIG. 3.

Referring to FIGS. 3 through 5, four bag filters 30 are laterally positioned inside powder receiving device 1. Multiple long filters 6 are horizontally attached to a cell plate 7 of bag filters 30. A retainer (not shown) having an elliptical lateral cross-section shape is covered with a long, thin, envelope-shaped filter cloth to form long filter 6. During dust collection, the filter cloth contracts and attracts powder. During pulsed backwash phases, the filter cloth expands to a roughly elliptical shape, filling a gap formed between adjacent filter cloths. The impact between adjacent filter clothes during backwash phases causes powder to be brushed off.

The bases of long filters 6 are attached to multiple holes in vertically positioned cell plate 7. The result is a grid in which cell plates 7 and long filters 6 are perpendicular to each other. Cell plates 7 partition an inner space of powder receiving device 1 into a loading chamber 40, where powder is loaded, and a suction chamber 50. Multiple suction motor fans 8, positioned above long filters 6, are used for dust collection. Suction motor fans 8 include air suction openings 8a and air vent openings 8b. Air suction openings 8a open into suction chamber 50. Air vent openings 8b open into vent chamber 60. Bag filters 30 include multiple backwash air jet nozzle pipes 14 laterally extended across the inside of suction chamber 50. Electromagnetic valves 14a feed high-pressure air pulses to air-jet nozzle pipes 14. Air filtered through long filters 6 is taken into air suction opening 8a from suction chamber 50. The air is then let out into vent chamber 60 through air vent opening 8b, where the air is branched out in two directions by a flap 9. Japanese patent number 2634042, entitled "Bag Filter Device", herein incorporated in its entirety by reference, describes a bag filter usable as bag filter 30 of the present invention.

Flap 9 is in front of air vent opening 8b which opens into vent chamber 60. Air led into air vent chamber 60 from air vent opening 8b branches out into either loading chamber 40 (to the left in FIG. 4) or an air box 12 (down in FIG. 4). The amount of air led into loading chamber 40 and air box 12 is controlled by adjusting flap 9. A horizontal air duct 10 horizontally guides air branched upward by flap 9. A portion of the upwardly branched air is let out into an upper section of loading chamber 40. A cleaning air blowing opening 10a, at the end of horizontal air duct 10, opens into loading chamber 40 through an elongated curtain extending above the length of powder loader opening 2. An air curtain blowing opening 10b is a laterally elongated duct disposed on an upper surface of the front side of powder receiving device 1. A portion of the air flowing through horizontal air duct 10 is blown into loading chamber 40, while most of the air is blown out from powder receiving device 1 through air curtain blowing opening 10b.

A vertical air duct 11 guides air branched downward by flap 9 inside receiver hood 1a. The air is blown downward from an outlet opening 11a of vertical air duct 11, scattered laterally inward at a long air box 12. Long air box 12 is laterally positioned at a lower section of powder receiving device 1. An air nozzle 12a releases the air scattered in air box 12 into a powder loading hopper disposed at an opening at a lower surface of powder receiving device 1. The air blown from air nozzle 12a and the air blown from air curtain blowing opening 10b accelerate the fluidity of powder inside loading chamber 40 when powder is loaded. The blown air also provides cleaning for the inside of loading chamber 40 and powder loading hopper 16 after powder loading is complete.

An inspection door 13 is installed at the back of powder receiving device 1. Inspection door 13 is opened to replace filters 6 and to inspect the inside of powder receiving device 1. Inspection door 13 is opened and closed as indicated by the dotted lines in FIG. 7.

An access door 20, positioned below inspection door 13, contains a control unit 15. Powder loading hopper 16 (see the dotted lines in FIG. 3 and FIG. 5) is connected to an opening on a bottom surface of powder receiving device 1. As described above, high-pressure air blown out from air nozzle 12a is blown inside powder loading hopper 16.

Figure 8:
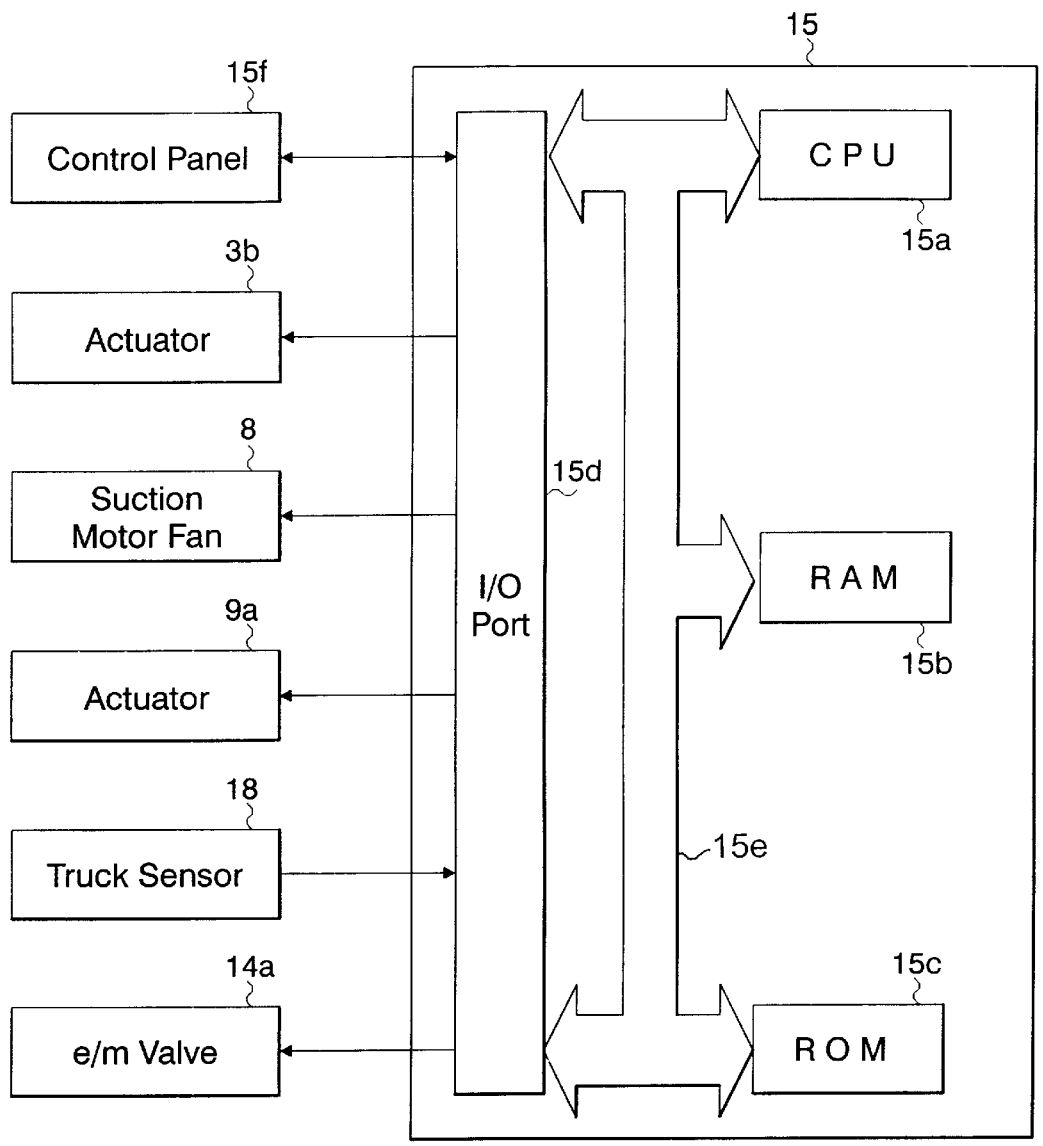
FIG. 8 is a block diagram of the control unit system from the powder receiving device of FIG. 3.

Referring to FIG. 8, control unit 15 contains a microcomputer. The microcomputer includes a CPU 15a, RAM 15b, ROM 15c, an I/O port 15d, and a bus line 15e, connecting each of these elements. I/O port 15d connects to a control panel 15f, actuator 3b, suction motor fan 8, an actuator 9a, a truck sensor 18, and an electromagnetic valve 14a. Control unit 15 controls powder loading operations.

Referring to FIGS. 10 through 13, the following is a description of how powder receiving device 1, according to a preferred embodiment of the present invention, is installed in a loading section of powder/feed plant 101 for receiving bulk shipments of powder.

Figure 1:
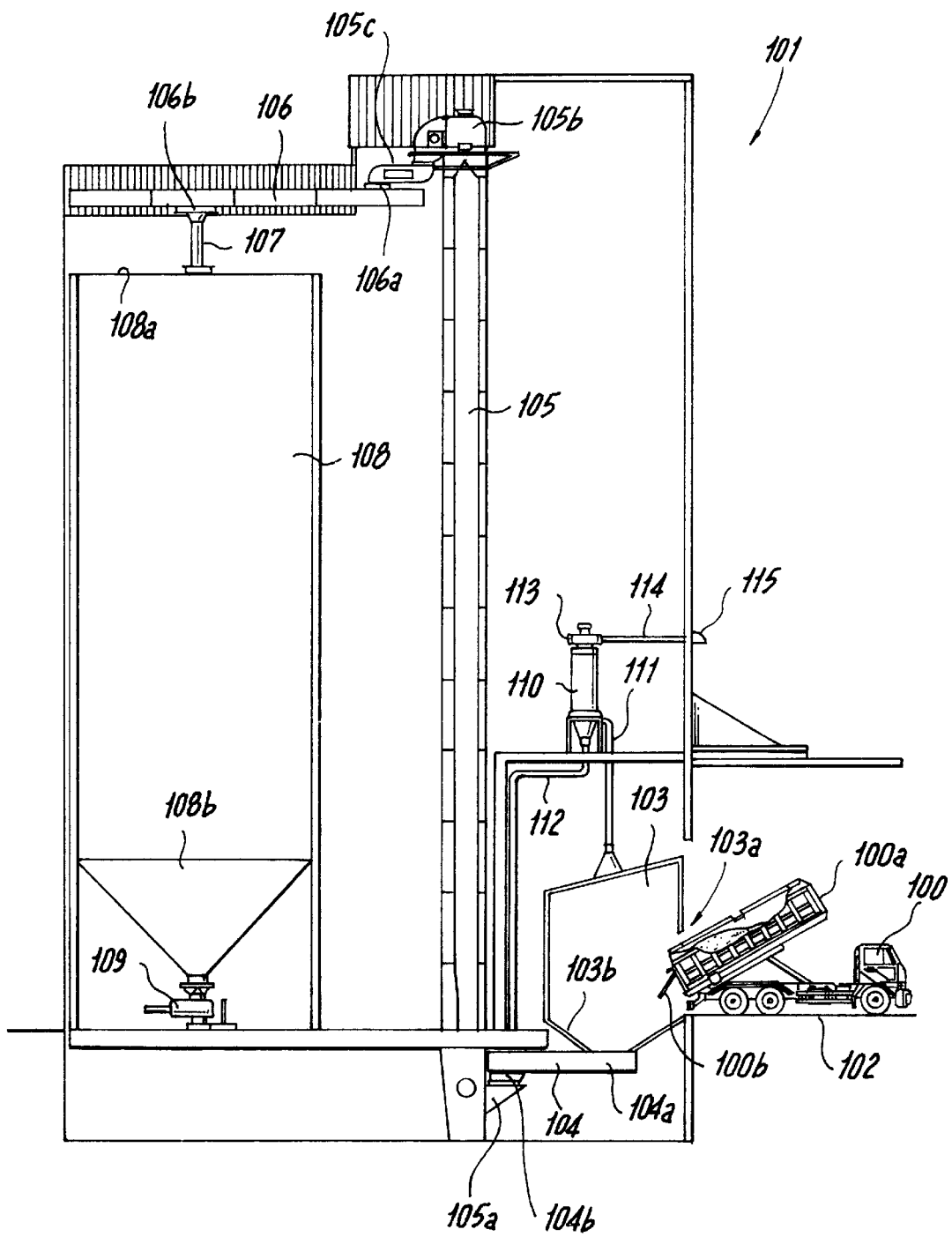
FIG. 1 is a cross section of a powder receiving device according to a conventional technology.
Figure 2:
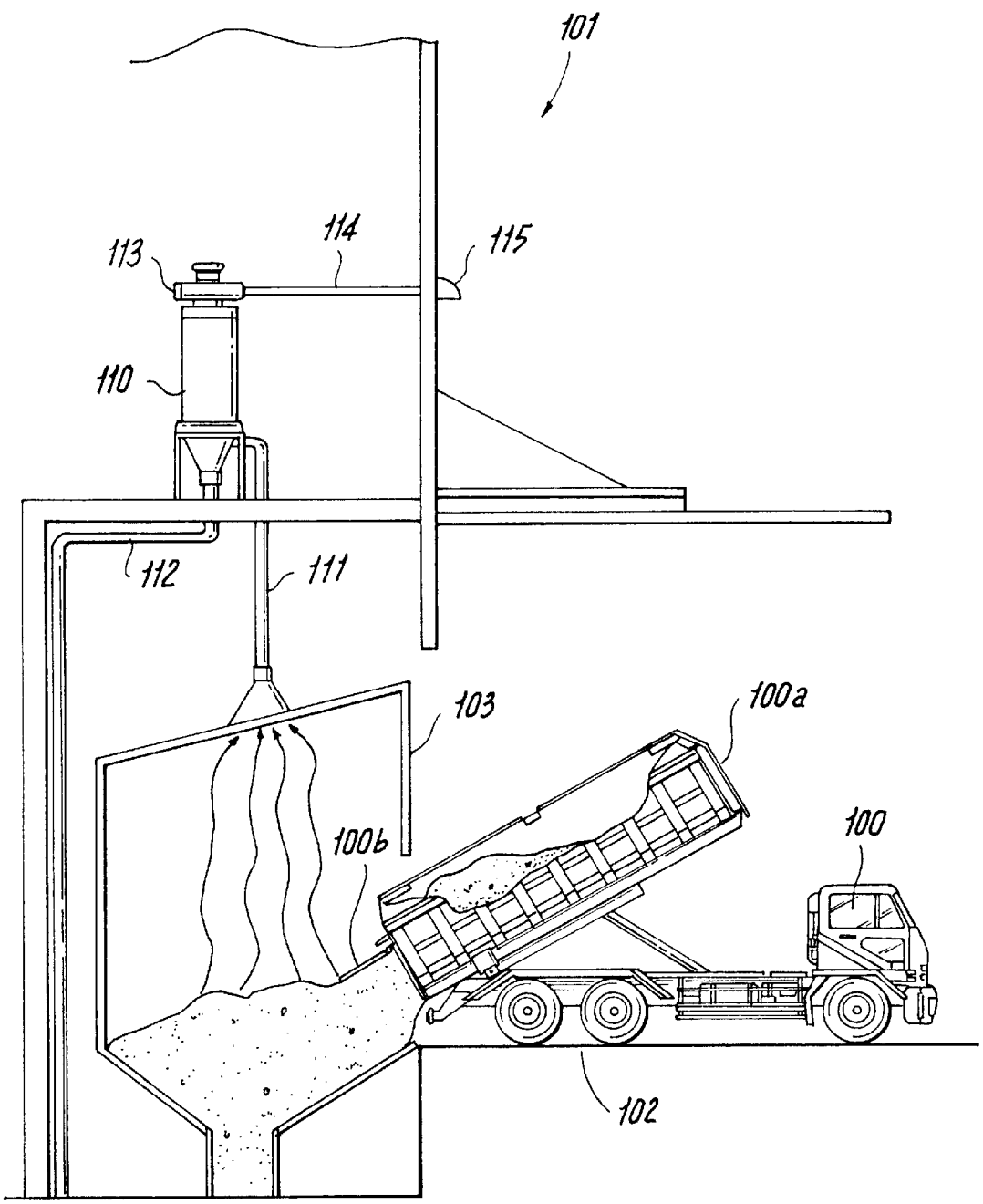
FIG. 2 is an enlarged cross section drawing of a portion of the powder receiving device of FIG. 1.

First, truck sensor 18 is installed on the ground of a truck receiving area 80 into which a dump semi-trailer is driven. Next, electrical connections are made between a power supply and control unit 15 as well as between truck sensor 18 and control unit 15. Pipes for high-pressure air are then laid out. To compare the powder receiving device of the present to a conventional powder receiving device as shown in FIGS. 1 and 2, in plant 101, powder receiving device 1 is installed in place of conventional receiver hood 103, dust collector 110, suction pipe 111, circulation pipe 112, fan 113, and exhaust opening 115.

The housing and the like for powder receiving device 1 can be formed from any suitable material, preferably a light metal, more preferably, aluminum plates. The use of aluminum plates makes the device lighter, allowing installation in large-scale plants without the need for reinforcements. The device is assembled with internally bent materials using bolts and nuts. Welding is avoided as much as possible. Thus, the cosmetic appearance is improved by having a housing substantially free from external projecting elements. Also, transportation of the device is relatively easy, since the device is assembled as a single unit at a production plant before transporting to a powder/feed plant or the like. Installation in the plant simply involves connecting the wiring, high-pressure air pipes, and the like. The ease of installation significantly reduces installation time.

Powder receiving device 1, installed in a receiving section of powder/feed plant 101 in the manner described above, is placed in a standby state by turning on power to control panel 15f (see FIG. 8). Powder receiving operation is performed based on a program stored beforehand in control unit 15.

Figure 9:
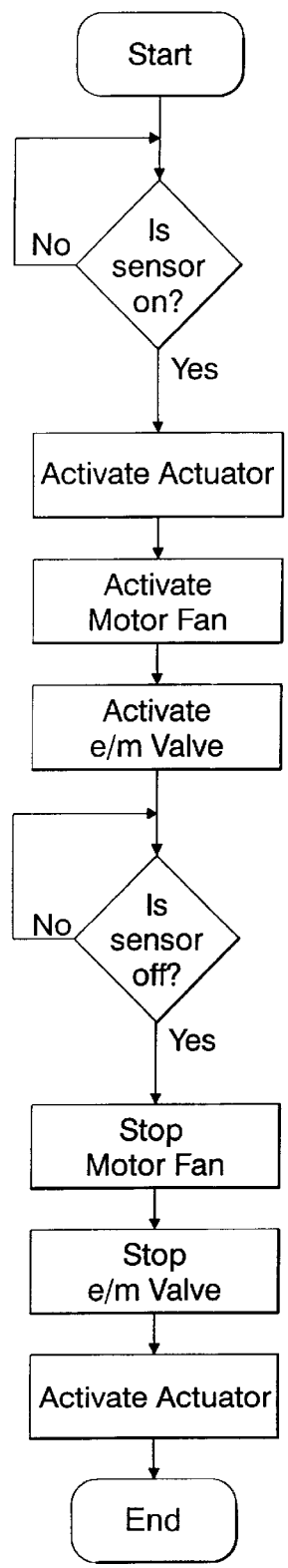
FIG. 9 is a flowchart showing the operations performed by the control unit of FIG. 8 during automated bulk shipping of powder.
Figure 10:
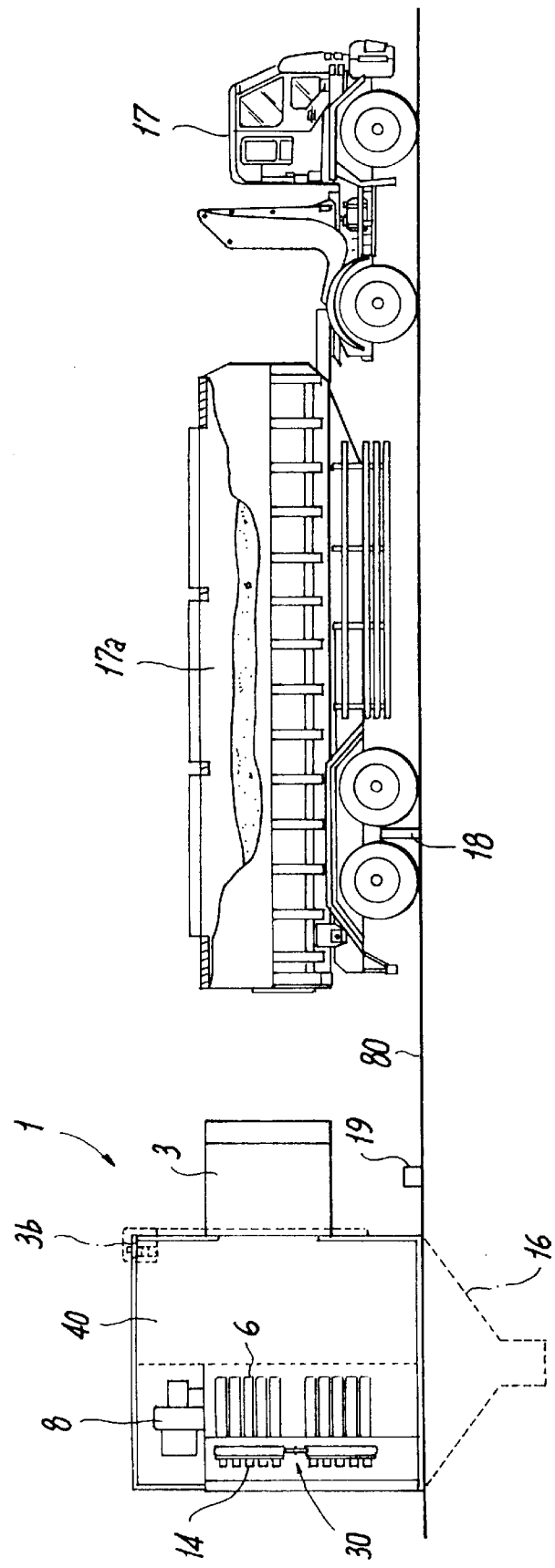
FIG. 10 is a partial cross sectional drawing of a truck approaching a powder receiving device.

Referring to FIGS. 8 through 10, when power to control panel 15f is turned on, CPU 15a begins powder receiving operation and control goes to step 100. CPU 15a repeatedly checks truck sensor 18 (see FIGS. 10 through 13). CPU 15a waits for truck sensor 18 to be turned ON. When dump semi-trailer 17 enters the receiving section and passes truck sensor 18, truck sensor 18 detects the entry of dump semi-trailer 17, sending a signal to control unit 15. As a result, step 100 determines that truck sensor 18 has been turned ON. If a NO is returned, the operation is repeated.

When control proceeds to step 110, CPU 15a sends an open signal to actuator 3b, opening automatic opening/closing gate 3. Automatic opening/closing gate 3 protects the powder loading process from horizontal air currents. At step 120, a drive signal is sent to suction motor fan 8, creating a negative pressure inside filter 6. At step 130, CPU 15a sends a drive signal to electromagnetic valve 14a to perform backwashing of bag filter 30.

Figure 11:
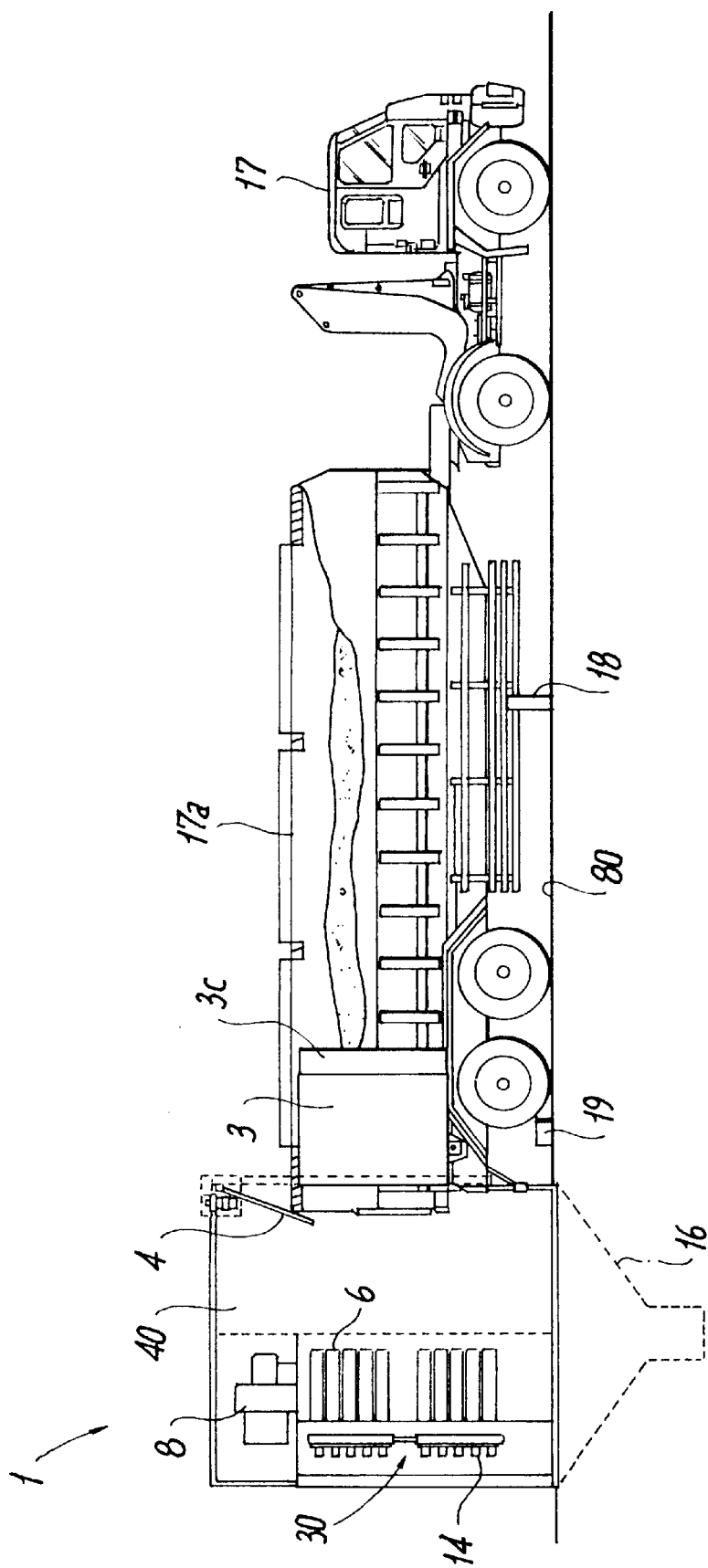
FIG. 11 is a partial cross sectional drawing of the rear of the truck entering a powder loading opening of a powder receiving device.

Referring to FIG. 11, dump semi-trailer 17 moves container 17a back stopping at a truck stopper 19. Container 17a enters powder loading opening 2. Seal member 4 is pushed by container 17a, pivoting rearward. Seal member 5 is pushed by container 17a, pivoting frontward. Side surfaces of container 17a are covered by dust-protection vinyl sheets 3c attached to the end of automatic opening/closing gate 3. Thus, the inside of powder receiving device 1 is separated from the outside of powder receiving device 1.

Figure 12:
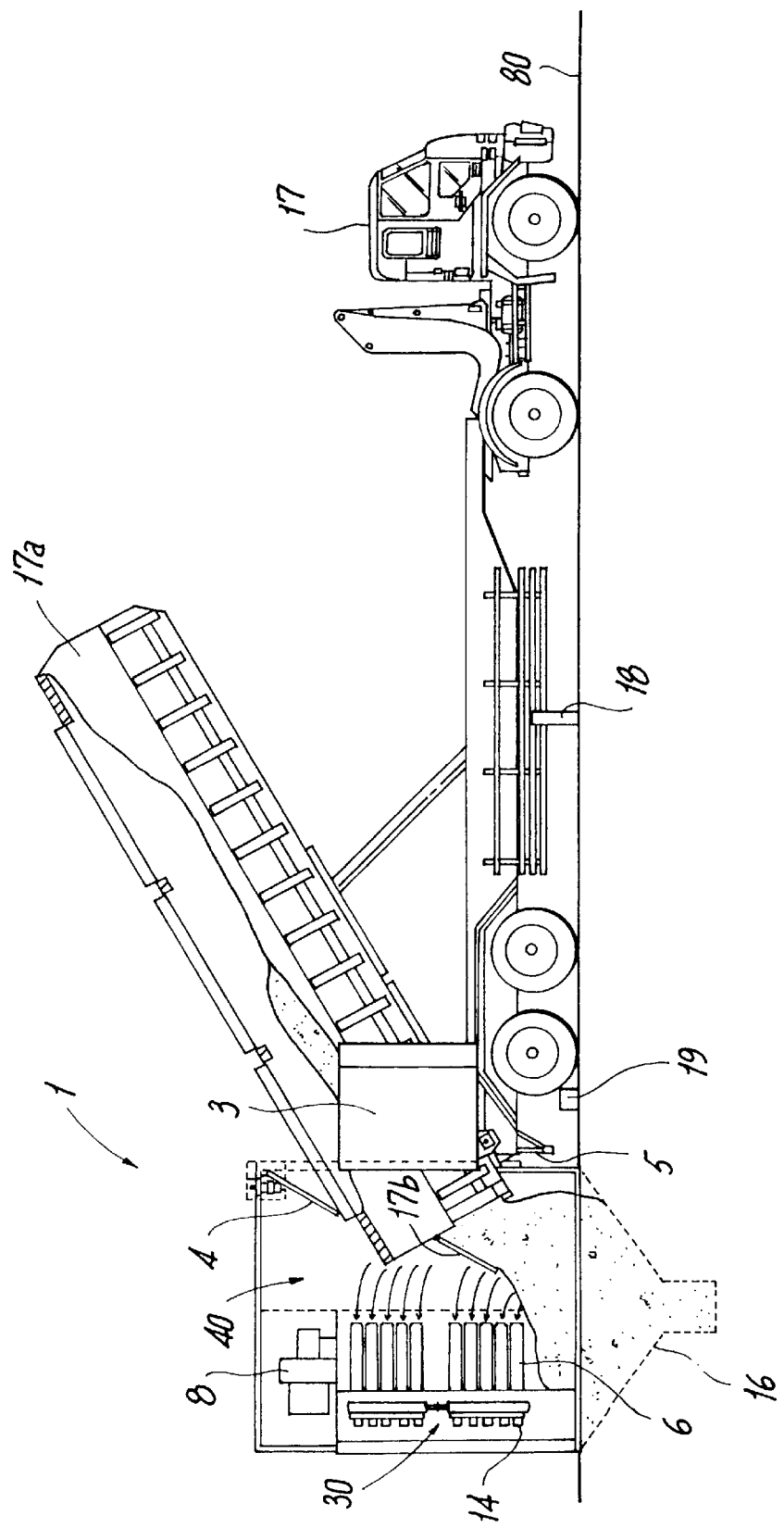
FIG. 12 is a partial cross sectional drawing of the powder being loaded from the truck to a powder receiving device.

Referring to FIGS. 9 and 12, when a rear end of container 17a enters completely into powder receiving device 1, the driver lifts container 17a. The lifting of container 17a causes powder loaded in container 17a to be dropped into powder receiving device 1 from a door 17b disposed on a section of the rear surface of container 17a. Powder moves from powder outlet hopper 16 into the next section (silo 108 from FIG. 1 and the like). At step 120, suction motor fan 8 activates inside powder receiving device 1 to perform dust collection by applying a negative pressure to filter 6. Powder dropped into powder receiving device 1 is kept from escaping by dust collection performed by filter 6, as indicated by the arrows in FIG. 12.

Referring to FIGS. 3 and 9, air is blown out from cleaning air blowing opening 10a and air curtain blowing opening 10b to clean container 17a of dump semi-trailer 17. Air blown from air nozzle 12a also increases powder fluidity to help prevent clogging. At step 130, electromagnetic valve 14a activates to perform backwashing by sending air pulses to backwash air jet nozzle pipe 14. In response to input from control panel 15f, actuator 9a appropriately adjusts the angle of flap 9.

At step 140, CPU 15a waits for truck sensor 18 to be turned OFF. Once powder from container 17a is completely unloaded, empty container 17a returns to its base. Dump semi-trailer 17 then moves forward, causing sealing members 4 and 5 to be restored by springs to their upright positions.

Figure 13:
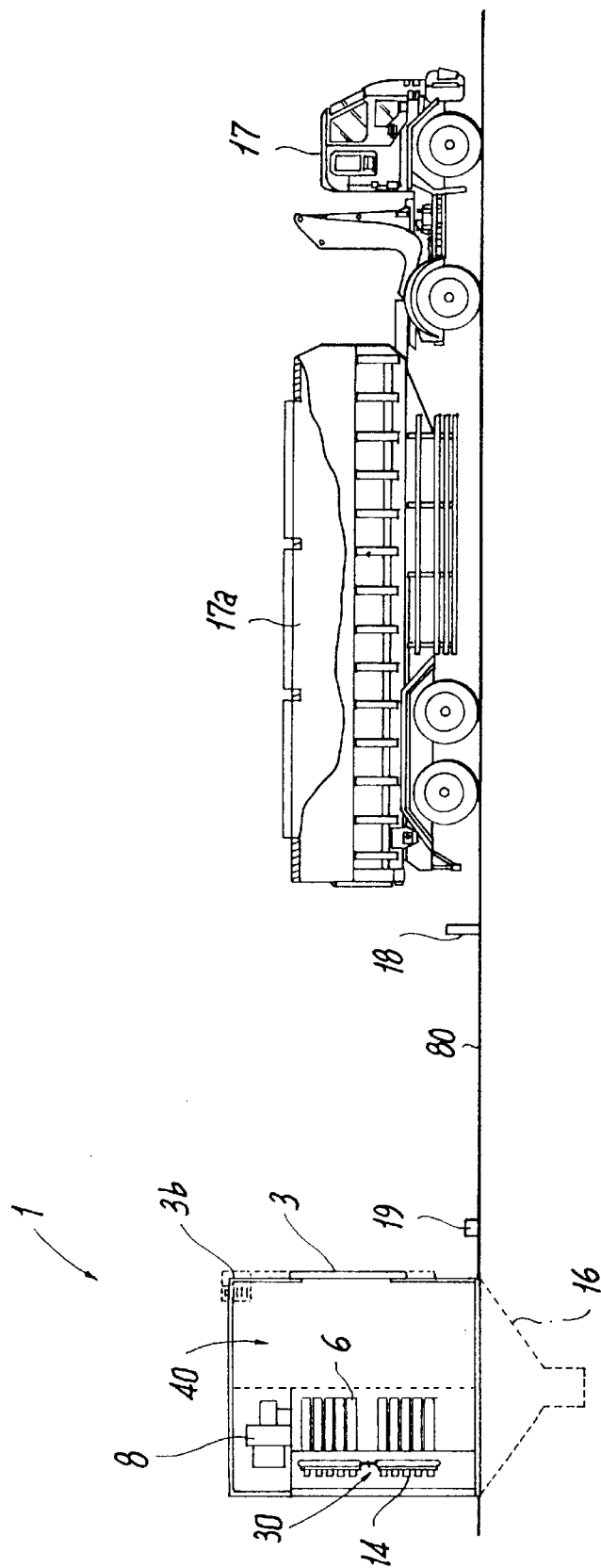
FIG. 13 is a partial cross sectional drawing of the truck moving away from a powder receiving device.

Referring to FIGS. 9 and 13, dump semi-trailer 17 moves away from the position of truck sensor 18, causing trucking sensor 18 to send an OFF signal. CPU 15a reads this sensor signal to determine whether the sensor signal is now OFF. This operation is repeated if the response is NO.

At step 150, CPU 15a closes automatic opening/closing gate 3 while sending a stop signal to suction motor fan 8 to halt dust collection. At step 160, CPU 15a sends a stop signal to electromagnetic valve 14a to halt backwash operations. As a result, powder receiving device 1 halts dust collection and backwash operations for bag filter 30. At step 170, CPU 15a sends a close signal to actuator 3b to close automatic opening/closing gate 3. This completes the powder receiving operation. At completion, powder hopper 16 is empty. Dust cleaning and backwash operations are performed as appropriate to clean out residual powder inside powder receiving device 1.

With the structure described above, the embodiment of the present invention provides the advantages described below.

(1) During unloading of powder, filter 6 of bag filter 30 is positioned close to the dust source near rear door 17b of container 17a of dump semi-trailer 17. This positioning allows a uniform pressure distribution, preventing air from stagnating, providing efficient dust collection. Also, the need for the suction duct of the conventional technology is eliminated. This reduces the pressure loss at the duct and allows the use of an economical, quiet, and low-power suction motor fan 8.

(2) Powder brushed off from filter 6 falls freely to be retrieved in powder loading hopper 16. This allows for efficient powder reception.

(3) During the powder receiving operation, dust protection vinyl sheets 3c shield an area behind container 17a of dump semi-trailer 17. This prevents powder from leaking outside.

(4) By using an insect screening sheet as dust protection vinyl sheets 3c, insects are prevented from entering into powder receiving device 17a from the outside.

(5) When powder receiving device 1 idle, automatic opening/closing gate 3 and sealing members 4 and 5 seal off the opening of receiver hood 1a. This prevents powder from flying out, keeping the loading section tidy. When automatic opening/closing gate 3 is open, the receiving operation is protected from horizontal air currents.

(6) The housing of powder receiving device 1 is preferably formed by assembling aluminum plate panels. This provides a light yet large device without requiring external reinforcements.

(7) Since the main elements such as receiver hood 1a, bag filter 30, and control unit 15 are integrally formed as a single system, transporting the device is made easier.

(8) The installation of the unit in a plant involves a modular method where the unit is installed directly in the plant. This greatly reduces the time required for installation. The modular method also facilitates maintenance and cleaning after operation in the plant.

(9) By using an eccentric sprocket mechanism in automatic opening/closing gate 3 to provide offset timings for the opening and closing of left and right gates, the folding up of dust protection vinyl sheet 3c attached at the end of each gate is facilitated.

(10) Air from suction motor fan 8 is blown out in the form of an air curtain from cleaning air blowing opening 10a to container 17a of dump semi-trailer 17. This allows for the cleaning of container 17a.

(11) By having bag filter 30 installed inside powder receiving device 1, residual powder at internal corners of the housing are eliminated and the device can be assembled as a box using bolts and nuts to connect internally bent flanges. This eliminates projections (externally bent flanges and the like) from an outer surface of the housing, improving the appearance of the device while making cleaning easier.

(12) Suction motor fan 8 is covered by receiver hood 1*a* so that noise during operation is minimized.

(13) Since the angle of flap 9 is adjustable, flow of air within powder receiving device 1 can be freely controlled.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A powder receiving device comprising:

a housing;

a loading chamber within a housing;

said loading chamber for conveying powder to a hopper therebelow and having a powder loading opening in said loading chamber;

a blower drawing air on an air path from said loading chamber;

a container containing powder to be loaded through said powder loading opening into said loading chamber;

a first air outlet from said air path;

said first air outlet being close to said hopper, thereby increasing a fluidity of said powder in said hopper, whereby a flow of said powder through said hopper is improved;

a second air outlet high in said loading chamber for producing a downward flow of air toward said hopper and a third air outlet from said air path;

said third air outlet being on an exterior of said loading chamber above said powder loading opening, whereby powder in said container is preferentially directed from said container into said loading chamber.

2. A powder receiving device according to claim 1, wherein said second air path produces a curtain of air flowing from a top surface of said loading chamber toward said hopper.

3. A powder receiving device according to claim 1, further comprising:

at least one bag filter in said air path;

said bag filter being effective for filtering particles of powder in said air path.

4. A powder receiving device according to claim 3, further comprising backwash means for directing pulsed jets of air on said at least one bag filter to release said particles from said bag filter.

5. A powder receiving device according to claim 4, wherein said at least one bag filter is positioned whereby said particles released from said at least one bag filter by said backwash means fall downward into said powder loading, hopper.

6. A powder receiving device for receiving powder comprising:

a housing;

a loading chamber within said housing for receiving said powder wherein said loading chamber includes a powder loading opening through which said powder is loaded; and said powder loading opening includes sealing members opening and closing said powder loading opening;

a powder loading hopper attached at a bottom of said housing to direct powder from said loading chamber to an external location;

a blower;

said blower moving air on an air path originating inside said loading chamber;

at least one bag filter in said housing in said air path;

said bag filter being effective for filtering particles of said powder in said air path;

said at least one bag filter being positioned to permit said particles to fall into said powder loading hopper upon release from said bag filter;

an adjustable flap directing filtered air in said air path;

said flap creating an upper air path and a lower air path;

said upper air path directing a first portion of air through an air curtain blowing opening located at an exterior surface of said powder receiving device above said powder loading opening;

said upper air path directing a second portion of air through a cleaning air blowing opening located at an upper interior surface of said loading chamber above said powder loading opening;

said lower air path guiding air into said powder loading hopper at said powder outlet opening; and said upper and lower air paths providing both means for increasing a fluidity of said powder during operation of said powder receiving device as well as means for cleaning said powder receiving device.

7. A powder receiving device according to claim 1, further comprising backwash means for directing pulsed jets of air on said at least one bag filter, whereby said particles are dislodged from said bag filter.

8. A powder receiving device according to claim 7, wherein said at least one bag filter is oriented toward said powder loading opening whereby said backwash means releases powder on said at least one bag filter into said powder loading hopper.

9. A powder loading device according to claim 6, wherein said powder loading opening includes opening/closing gates opening and closing on an exterior surface of said sealing members.

10. A powder receiving device according to claim 9, further comprising a dust protection sheet covering said opening/closing gate.

11. A powder receiving device according to claim 9, further comprising an eccentric sprocket mechanism disposed on said opening/closing gates.

12. A powder receiving device according to claim 6, wherein said at least one bag filter includes a plurality of bag filters disposed laterally in a row.

13. A powder receiving device according to claim 6, further comprising:

a sensor detecting an approach of a transporting means;

means for automatically opening and closing said powder loading opening when said transporting means is detected.

14. An integrated powder receiving device comprising:

a housing;

a powder loading chamber in said housing wherein said loading chamber includes a powder loading opening through which said powder is loaded; and said powder loading opening includes sealing members opening and closing said powder loading opening;

a powder loading hopper attached at a bottom of said powder loading chamber to receive powder from said housing and to direct powder to an external location;

a fan drawing air from said powder loading hopper into an air path;

at least one bag filter in said air path;

said bag filter being of a type effective for filtering airborne particles of said powder from said air path;

said air path directed to at least one high location and one low location in said housing;

an adjustable flap directing filtered air in said air path;

said flap creating an upper air path and a lower air path;

said upper air path directing a first portion of air through an air curtain blowing opening located at an exterior surface of said powder receiving device above said powder loading opening;

said upper air path directing a second portion of air through a cleaning air blowing opening located at an upper interior surface of said loading chamber above said powder loading opening;

said lower air path guiding air into said powder loading hopper at said powder outlet opening; and said upper and lower air paths providing both means for increasing a fluidity of said powder during operation of said powder receiving device as well as means for cleaning said powder receiving device.

15. An integrated powder receiving device according to claim 14, further comprising:

a first air vent at an end of said air path directed to said high location;

said first air vent located near a top of said powder loading chamber, whereby an air curtain is formed inside said powder loading chamber;

a second air vent at an end of said air path directed to said low location; and said second air vent located near an upper portion of said powder loading hopper.

16. An integrated powder receiving device according to claim 14, wherein said air path additionally directs air to an exterior region above a container containing powder being loaded into said powder receiving device.

17. An integrated powder receiving device according to claim 14, further comprising backwash means for directing pulsed jets of air on said at least one bag filter to release said particles from said bag filter.

18. An integrated powder receiving device according to claim 17, wherein said at least one bag filter is oriented toward said powder loading opening whereby said particles released from said at least one bag filter by said backwash means fall downward into said powder loading hopper.

* * * * *